United States Patent [19]
Goglio

[11] 3,799,427
[45] Mar. 26, 1974

[54] DEGASSING VALVE FOR HERMETICALLY SEALED FLEXIBLE CONTAINERS AND A CONTAINER PROVIDED WITH THE VALVE

[76] Inventor: Luigi Goglio, Via Solari 10, Milan, Italy

[22] Filed: Mar. 5, 1973

[21] Appl. No.: 337,870

[30] Foreign Application Priority Data
Dec. 4, 1972 Italy.................................. 32439/72

[52] U.S. Cl.............. 229/62.5, 137/525.3, 137/246, 150/9
[51] Int. Cl.............................................. B65d 31/14
[58] Field of Search............ 137/246-246.23, 525.3; 150/9; 215/11 B, 11 D, 56; 229/62.5

[56] References Cited
UNITED STATES PATENTS

| | | | |
|---|---|---|---|
| 3,292,652 | 12/1966 | Gallone................................ | 137/246 |
| 3,302,859 | 2/1967 | Perry.................................... | 229/62.5 |
| 3,319,836 | 5/1967 | Cubitt.................................. | 137/525.3 |
| 3,371,849 | 3/1968 | Rochla................................. | 229/62.5 |
| 3,430,842 | 3/1969 | Yamaguchi.......................... | 229/62.5 |
| 3,432,087 | 3/1969 | Costello............................... | 229/62.5 |
| 3,595,467 | 7/1971 | Goglio................................. | 137/525.3 |
| 3,670,760 | 6/1972 | Butcher et al...................... | 137/525.3 |

*Primary Examiner*—Alan Cohan
*Assistant Examiner*—George L. Walton
*Attorney, Agent, or Firm*—Steinberg & Blake

[57] ABSTRACT

A unidirectional degassing valve for products in thermoweldable flexible containers, comprising a thermoplastic material moulded base member provided with at least one conduit; a resilient valve member normally closing said conduit and bearing on the base member through a viscous layer; and a cap connected with said base member, therewith defining a chamber wherein said resilient valve member is located, and provided with at least one exhaust aperture, through which said chamber communicates with the external atmosphere.

14 Claims, 5 Drawing Figures

DEGASSING VALVE FOR HERMETICALLY SEALED FLEXIBLE CONTAINERS AND A CONTAINER PROVIDED WITH THE VALVE

This invention relates to a degassing valve for hermetically sealed thermo-weldable containers, particularly designed for air-contact perishable products. The invention is also concerned with a flexible container provided with the degassing valve.

Upon air contact, many foodstuffs deteriorate and accordingly lose the organoleptic properties thereof. Therefore, such foodstuffs are preserved in rigid vacuum containers.

Some of these products, such as roast coffee, grated cheese and the like, enclose substantial amounts of gases slowly issuing inside the packing within a determined time interval. Such gases cannot be removed in the course of the packing step, since the evacuating process is carried out in an extremely short time, that is in a time unsuitable for removing the gas included in the product body.

This is not a disadvantage where rigid containers are used, as such containers are made sufficiently sturdy to withstand these stress conditions.

On the other hand, the flexible containers, which due to the lower weight and cost thereof, would be more advantageous than the rigid containers, cannot be used for packaging such types of products, as hardly capable of withstanding the dual stress they would be subjected to. Then there is the problem of deformability. Thus, during the evacuation step, while the container adheres to the product according to a predetermined shape, during the gas emitting step said container tends to swell, thereby building up space and handling problems.

It is the object of the present invention to provide a valve for flexible containers capable of degassing the product therein contained while being reliable under any conditions without giving rise to transient phenomena and without allowing thereby for any interchanges with environmental or room air with a resulting deterioration of the contents.

To this end, it was proposed to use thermoweldable flexible containers, formed of two or more material layers, the inner layer of which is of a thermo-weldable material (such as polypropylene or polyethylene), incorporating a unidirectional valve allowing for degassing the product following its introduction and hermetical sealing of the container.

However, it was found that such known containers suffer from the disadvantage of the unpractical use thereof in connection with powdered or finely granulated products, such as grated cheese, ground coffee and the like, as such materials tend to penetrate into the degassing valve of the container and to cause a poor operation thereof. In other words, it was found that, when using such containers for pulverulent or granular products, the latter will tend to move at the valve sealing parts, so that the latter would not operate reliably, that is would not perfectly close the internal space of the container with respect to the external environment; thereby there is some possibility of an exchange between the internal gas and room air, so that in time the product is liable to deterioration upon contacting the incoming oxygen.

Under this aspect, to improve the above type of known containers provision was made in the valves for means preventing the pulverulent material from adversely affect the valve operation. This enables to use a container for preserving pulverent or granular foodstuffs that are to be subjected to vacuum process and degassed.

According to this known proposal, the hermetically closed thermo-weldable flexible container comprises at least one check valve, attached by thermo-welding to a face thereof and provided with a wall having a plurality of fine holes passing therethrough for preventing any access of pulverulent granular material to the valve sealing parts.

However, such valves may rather frequently suffer from disadvantages due to some transiency or instability in operation of the rubber disc or diaphragm which, because of uncorrect closure, would allow for some exchange with room air, which is objectionable for some products, such as roast coffee.

Surprisingly, it was found that this disadvantage can be overcome according to the invention with a valve that is essentially characterized by comprising the combination of a. a moulded thermoplastic material base member provided with at least one conduit
b. a resilient valve member normally closing said conduit and laying on the base member through a viscous layer; and
c. a cap connected to said base member, defining with the latter a chamber wherein said resilient valve member is located, and provided with at least one exhaust aperture through which said chamber communicates with the external atmosphere.

The invention will be more clearly understood from the following detailed description, given by mere way of not limiting example, for a preferred embodiment thereof, as shown in the accompanying drawing in which.

Figure 1:
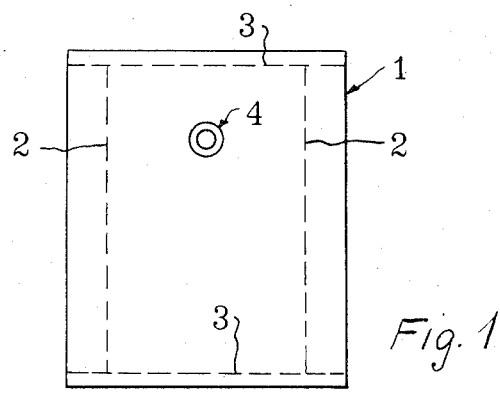
FIG. 1 is a side view on a reduced scale showing a hermetically sealed thermoweldable flexible bag incorporating a degassing valve.

Referring to the drawings, reference numeral 1 designates as a whole a thermoplastic material bag comprising, for example, a laminate, that is a material made of a plurality of layers stably joined to one another, wherein the inner layer is, for example, polyethylene, polypropylene or the like, that is a plastic material that can be thermowelded, while the other layers may comprise other materials, such as synthetic or metal materials, accomplishing the function of ensuring the container tightness. Particularly, the container shown in FIG. 1 is of the side bellows type, shown by broken lines 2, and at the top and at the bottom the bag is sealed by cross welds 3.

On one of its walls said container 1 has a valve, indicated as a whole at 4.

This valve serves the purpose of preventing any access of room air to the interior of the container in order to avoid the deterioration of the foodstuff in the container, while permitting a degassing effect of the product to the external environment when the gas reaches a determined pressure rate.

Figure 2:
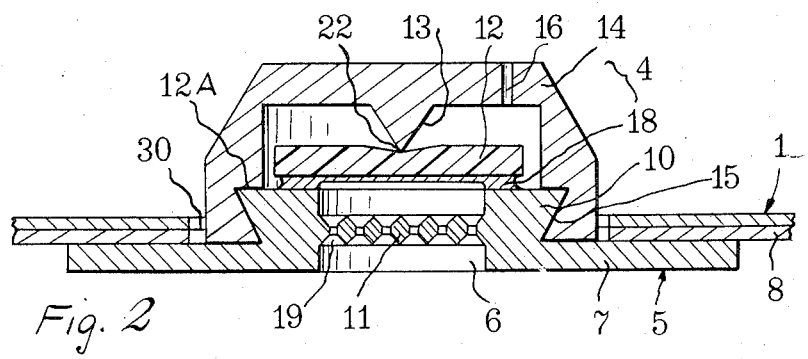
FIG. 2 is a diametrical sectional view on an enlarged scale showing the inventive valve incorporated in the bag shown in FIG. 1.

The valve 4 comprises a base body, indicated as a whole at 5, which is of a substantially circular configuration and has a central bore or channel 6. The base body 5 has a flange or annularly shaped planar portion 7 along which, as clearly shown in FIG. 2, the connection is effected by thermowelding along the contour of a hole 30 formed in the bag, with the thermo-weldable inner layer 8 of bag 1 that, in the example shown, comprises two layers, namely the thermoweldable inner layer 8 (such as polyethylene), and an outer layer, such as aluminum and or other materials.

The base body 5 is moulded of a material such as low density polyethylene, but it could be of polypropylene or other thermoplastic material, and comprises a raised central portion 10 of a substantially frusto-conical shape, the major base of which is upward facing.

At a distance from and situated between the ends of channel 6, a perforated wall 11 is provided, integral with the base body 5 and moulded therewith.

This wall is provided with a plurality of fine holes 19 and prevents the generally pulverulent or granular product contained in the bag from moving to the operational parts of the valve and interfering with a proper operation of the latter, that is to enable the gases evolving within the container to be exhausted to the outside, while inhibiting a movement in an opposite direction for the room air, which, in the event of contacting the product would in time cause the deterioration thereof.

On the upper face 12A of the base body 7 which, as above mentioned, is thermo-welded to the wall of bag 1, a flexible disc 12 preferably of natural rubber rests and is effective as a sealing member, normally sealing off the channel 6, when the valve is closed. In order to ensure a thorough sealing and lack of instability in the valve operation, said disc 12 will rest on face 12A through a viscous layer 18.

Said viscous layer 18, comprising an oil not attacking the disc material, such as an ordinary silicone oil preferably of a high viscosity, can be provided by coating with oil either the disc 12, or the face 12A. A conical lug 13 presses on disc 12 and is provided by the inner bottom of a cap 14 moulded of thermoplastic material, such as high density polyethylene. At the bottom, this cap 14 has an annular groove 15 of a wedge-like cross-section corresponding to the configuration of lug 10 on base body 5. This enables the cap 14 to snap onto and engage the base body 5.

For degassing the contents, said cap 14 has at least one orifice 16 located on its upper wall.

Figure 3:
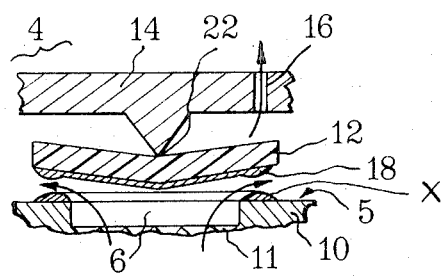
FIG. 3 is a fragmentary diametrical sectional view of part of FIG. 2 showing the valve at the condition of exhausting the gases evolved within the container.

As a predetermined inner pressure rate is attained, a sudden separation of disc 12 from the periphery of conduit 6 occurs, namely when the inner thrust exceeds the sum of the elastic reaction of the disc and the adhesion forces due to the viscous layer wetting both the disc 12 and surface 12A, as shown in FIG. 3 by X. After some time from degassing commencement, said disc 12 will approach said face 12A until the viscous layer adhering thereto approaches the viscous layer X to such an extent as to cause an interaction of the adhesion forces and accordingly, with the sudden union of the two viscous material layers, an impervious barrier without any interruptions of continuity is formed.

The viscous material layer may be about 50 micron thick and formed of silicone oil having 1440 centipoise viscosity at 20°C.

The provision of the viscous layer 18 is a main factor in the present invention as it allows to ensure the full unidirectionality of the valve. Thus, in the absence of the layer, critical operation conditions could arise when the elastic reaction of disc 12 is equalized by the inner pressure exerted by the gases, as a transient balance of the system would be provided. This would involve the possibility that in the circular resting area of disc 12, in the particular above mentioned transient balance state, an exchange of gases between the inner space and external atmosphere could occur as a result of diffusion. In order to avoid the disadvantages resulting from the gaseous diffusion phenomena, it is provided to interpose said viscous layer 18 between the disc 12 and bearing surface 12A for the purpose of transiency elimination. The provision of this layer building up adhesion forces is a reliable expedient for moving the system away from the transient balance state, as hereinafter shown.

Figure 4:
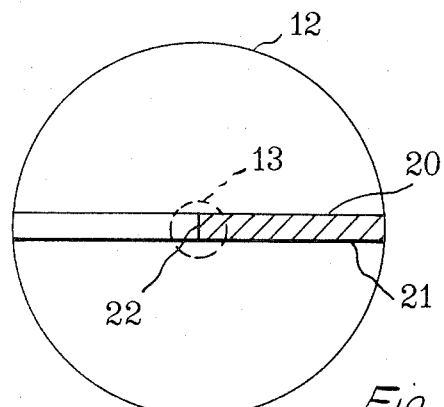
FIG. 4 is a plan view of the sealing disc.
Figure 5:
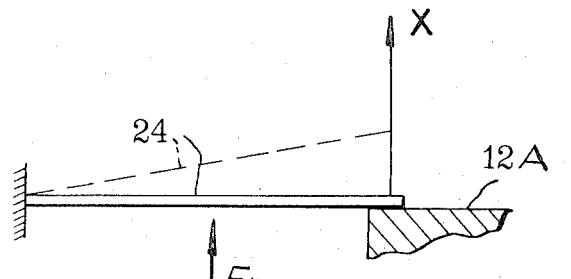
FIG. 5 is a view showing a bracket comparable with an element of the disc shown in FIG. 4.

Thus, now consider (see FIG. 4) an element of disc 12 between two parallel planes 20 and 21 at right angles to said disc, closely spaced apart from each other and equally spaced apart from the apex 22 of cone 13. In addition, due to the system symmetry, consider only one of the halves of said element extending throughout the disc. This half element (shown by hatch lines in FIG. 4) is comparable with a bracket 24 embedded at one end coincident with apex 22 and resting at the other end (the bearing or support being provided by said surface 12A).

The system is characterized by the following force state:

$F_p > F_e + F_a$ wherein:
 $F_p$ is the resultant of the gas pressure forces;
 $F_e$ is the elastic reaction of the system (elastic reaction of strut 24); $f_e$ is the reaction unit force $= F_e/x$ = force for unit displacement in the displacement X direction; and
 $F_a$ are the adhesion forces due to the viscous layer 18 and having the same direction as axis X.

The forces $F_a$ are effective only at deformation rates for the bracket (half element) 24 lower or equal to $x_0$, where $x_0$ is the maximum distance at which the adhesion forces would occur.

This being stated, the following conditions should be met for opening;

$F_p > F_e + F_a$
$F_p > f_e x + F_a$

For a displacement $x > x_0$, $F_a$ becomes instantaneously zero, whereby $F_p$ is much larger than $f_e x$ and disc 12 will further tend to open. Therefore, the system will further move away from conditions of any transiency.

Assume now to have a decreasing rate for $F_p$ (such as when the valve is open and the gas is emitted from a given closed volume container). In this case, as $F_p$ gradually decreases $F_p$ will be less or at maximum equal to $f_e x$. When $x$ is less than $x_0$ (at which value the adhesion forces begin to be effective), the new conditions are as follows:

$F_p$ much lower than $f_e x + F_a$.

Since the value for $F_a$ is always positive and other than O, this condition is further enhanced because:

$$x >> (F_p - F_a)/f_e$$

with respect to the previous conditions where: $x \geq F_p/f_e$.

Thereby, it will result that, as the valve closes, with the intervention of forces $F_a$, the transient balance conditions for the system are further averted.

These theoretical considerations were confirmed by laboratory tests, one of which is given hereinafter.

Two sets of 10 flexible bags were compared, one of the two sets provided with a valve without the viscous layer, and the other set provided with said layer.

These bags were filled with a same amount of roast grain Santos coffee, immediately evolving, after roasting, an amount of carbon dioxide which is 2–3 times its apparent volume within about one month.

After filling, air was evacuated to 99 percent vacuum, and then sealing the bags was carried out.

After four days, the interior of the containers was completely filled with carbon dioxide having a pressure equal to the external pressure. The pressure was measured by gauges hermetically applied to the bags.

Up to this point and until the internal pressure did not exceed by 5–6 cm. water the value of the external pressure, no emission of gas from the containers was observed.

At these values, the containers provided with the valve and without the viscous layer began to degas, and at a higher rate of about 1 cm. water, also the containers provided with viscous layer began to degas.

At regular time intervals (every 10 days), gas drawings from the bags were effected by a syringe to control the composition thereof by gas-chromatography and to check the percentage of any oxygen within the container. Said oxygen rate is the amount of air entered due to uncorrect operation of the valve.

The average results were as follows:

First set: without viscous layer

| drawings | Pressures | % $O_2$ |
|---|---|---|
| 1st at 4 days from packaging | Internal = External | ≤0.3 |
| 2nd at 14 days | Internal 6 cm $H_2O$ > External | ≤1.0 |
| 3rd at 24 days | Internal 6 cm $H_2O$ > External | =3.0 |
| 4th at 34 days | Internal 6 cm $H_2O$ > External | >6.0 |

Second set: with viscous layer

| Drawings | Pressures | % $O_2$ |
|---|---|---|
| 1st at 5 days from packaging | Internal = External | ≤0.3 |
| 2nd at 15 days | Internal 7 cm $H_2O$ > External | 0.3 |
| 3rd at 25 days | do. | 0.4 |
| 4th at 35 days | do. | 0.5 |

As apparent, there is a remarkable advantage in the second set of containers since the percentage variations in oxygen are minimal and quite acceptable, while in the first case the oxygen percentages are unacceptable for coffee preservation and show operational anomalies in the valve system without viscous layer.

The above results were obtained with a viscous layer about 50 microns thick, as formed of silicone oil having 1440 centipoise viscosity at 20°C.

What I claim is:

1. A unidirectional degassing valve for products in thermo-weldable flexible containers, characterized by comprising:
   a. a thermoplastic material moulded base member provided with at least one conduit;
   b. a resilient valve member normally closing said conduit and bearing on the base member through a viscous layer; and
   c. a cap connected with said base member, therewith defining a chamber wherein said resilient valve member is located, and provided with at least one exhaust aperture, through which said chamber communicates with the external atmosphere.

2. A valve as claimed in claim 1, wherein said conduit has a transverse wall pervious to gases.

3. A valve as claimed in claim 1, wherein an inner conical lug of said cap presses on said resilient valve member.

4. A valve as claimed in claim 1, wherein said cap is removably snap connected with said base member.

5. A valve as claimed in claim 1, wherein said resilient valve member is a rubber disc.

6. A valve as claimed in claim 1, wherein said viscous layer is of silicone oil.

7. A valve as claimed in claim 1, wherein said cap is moulded of thermoplastic material.

8. A thermo-weldable flexible container provided with at least one degassing valve thermo-welded thereto, said valve comprising:
   a. a base member moulded of thermoplastic material and provided with at least one conduit;
   b. a resilient valve member normally closing said conduit and bearing on said base member through a viscous layer; and
   c. a cap connected with said base member, therewith defining a chamber wherein said resilient valve member is located, and provided with at least one exhaust aperture, through which said chamber communicates with the external atmosphere.

9. A container as claimed in claim 8, wherein the conduit of said base member has a transverse wall pervious to gases.

10. A container as claimed in claim 8, wherein an inner conical lug of said cap presses on said resilient valve member.

11. A container as claimed in claim 8, wherein said cap is snap connected with said base member.

12. A container as claimed in claim 8, wherein said valve member is a rubber disc.

13. A container as claimed in claim 8, wherein said viscous layer is of silicone oil.

14. A container as claimed in claim 8, wherein said cap is moulded of thermoplastic material.

* * * * *

REEXAMINATION CERTIFICATE (626th)

United States Patent [19]
Goglio

[11] B1 3,799,427

[45] Certificate Issued  Feb. 3, 1987

[54] DEGASSING VALVE FOR HERMETICALLY SEALED FLEXIBLE CONTAINERS AND A CONTAINER PROVIDED WITH THE VALVE

[75] Inventor: Luigi Goglio, Milan, Italy

[73] Assignee: Flexible Packaging Research and Consulting, Amsterdam, Netherlands

Reexamination Request:
No. 90/000,978, Mar. 31, 1986

Reexamination Certificate for:
Patent No.: 3,799,427
Issued: Mar. 26, 1974
Appl. No.: 337,870
Filed: Mar. 5, 1973

[30] Foreign Application Priority Data

Dec. 4, 1972 [IT] Italy .................................. 32439/72

[51] Int. Cl.[4] ............................................. B65D 31/14
[52] U.S. Cl. ..................................... 383/103; 137/246; 137/843; 137/852; 137/854; 137/855; 137/856; 426/118
[58] Field of Search ................ 137/843, 852, 854–856, 137/246; 206/524.8; 383/48, 103; 229/DIG. 14; 426/118

[56] References Cited

U.S. PATENT DOCUMENTS

| 1,276,478 | 8/1918 | Bechtold | 137/512.4 |
| 1,797,280 | 3/1931 | Zerk | 137/843 |
| 2,361,344 | 10/1944 | Yates . | |
| 2,638,263 | 5/1953 | Jesnig . | |
| 2,738,091 | 3/1956 | Mattox . | |
| 2,752,943 | 7/1956 | Doeg | 137/512.15 |
| 2,870,954 | 1/1959 | Kulesza . | |
| 3,595,467 | 7/1971 | Goglio . | |
| 4,444,219 | 4/1984 | Hollenstein | 383/103 |

FOREIGN PATENT DOCUMENTS

| 239702 | 3/1964 | Austria . |
| 1657139 | 10/1971 | Fed. Rep. of Germany . |
| 1903048 | 5/1976 | Fed. Rep. of Germany . |
| 1360753 | 4/1964 | France . |

*Primary Examiner*—Stephen P. Garbe

[57] ABSTRACT

A unidirectional degassing valve for products in thermoweldable flexible containers, comprising a thermoplastic material moulded base member provided with at least one conduit; a resilient valve member normally closing said conduit and bearing on the base member through a viscous layer; and a cap connected with said base member, therewith defining a chamber wherein said resilient valve member is located, and provided with at least one exhaust aperture, through which said chamber communicates with the external atmosphere.

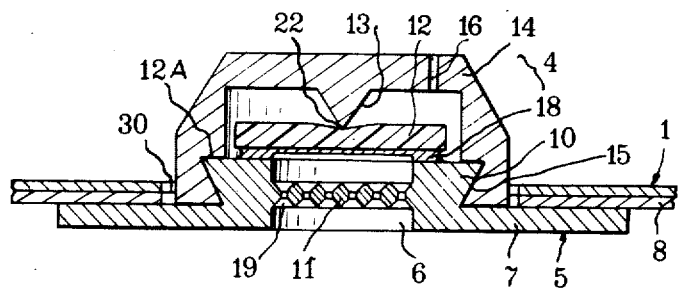

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-14 is confirmed.

* * * * *

REEXAMINATION CERTIFICATE (858th)
United States Patent [19]

Goglio

[11] B2 3,799,427

[45] Certificate Issued May 24, 1988

[54] DEGASSING VALVE FOR HERMETICALLY SEALED FLEXIBLE CONTAINERS AND A CONTAINER PROVIDED WITH THE VALVE

[76] Inventor: Luigi Goglio, Via Solari 10, Milan, Italy

Reexamination Request:
No. 90/001,175, Feb. 24, 1987
No. 90/001,232, May 1, 1987

Reexamination Certificate for:
Patent No.: 3,799,427
Issued: Mar. 26, 1974
Appl. No.: 337,870
Filed: Mar. 5, 1973

Certificate of Correction issued Feb. 3, 1987.

[30] Foreign Application Priority Data

Dec. 4, 1972 [IT] Italy ................................ 32439/72

[51] Int. Cl.⁴ .............................................. B65D 33/01
[52] U.S. Cl. ................................... 383/103; 137/246; 137/855; 426/118
[58] Field of Search ............... 137/855, 854, 852, 843, 137/856, 246; 206/524.8; 383/48, 103; 229/DIG. 14; 426/118

[56] References Cited

U.S. PATENT DOCUMENTS

| | | |
|---|---|---|
| 2,361,344 | 10/1944 | Yates . |
| 2,638,263 | 5/1953 | Jesnig . |
| 2,738,091 | 3/1956 | Mattox . |
| 2,870,954 | 7/1959 | Kulesza . |
| 3,195,283 | 7/1965 | Broersma ........................ 383/103 |
| 3,292,652 | 12/1966 | Gallone ........................... 137/246 |
| 3,302,859 | 2/1967 | Perry ............................... 229/62.5 |
| 3,319,836 | 5/1967 | Cubitt ............................ 137/525.3 |
| 3,371,849 | 3/1968 | Rochla ........................... 229/62.5 |
| 3,430,842 | 3/1969 | Yamaguchi .................... 229/62.5 |
| 3,432,087 | 3/1969 | Costello ......................... 229/62.5 |
| 3,595,467 | 7/1971 | Goglio ........................... 137/525.3 |
| 3,670,760 | 6/1972 | Butcher et al. ................ 137/525.3 |

FOREIGN PATENT DOCUMENTS

| | | |
|---|---|---|
| 239702 | 3/1964 | Austria . |
| 1119351 | 12/1961 | Fed. Rep. of Germany . |
| 1195830 | 7/1965 | Fed. Rep. of Germany . |
| 6608077 | 11/1965 | Fed. Rep. of Germany . |
| 1657139 | 10/1971 | Fed. Rep. of Germany . |
| 1903048 | 5/1976 | Fed. Rep. of Germany . |
| 1360753 | 4/1964 | France . |

*Primary Examiner*—Stephen P. Garbe

[57] ABSTRACT

A unidirectional degassing valve for products in thermoweldable flexible containers, comprising a thermoplastic material moulded base member provided with at least one conduit; a resilient valve member normally closing said conduit and bearing on the base member through a viscous layer; and a cap connected with said base member, therewith defining a chamber wherein said resilient valve member is located, and provided with at least one exhaust aperture, through which said chamber communicates with the external atmosphere.

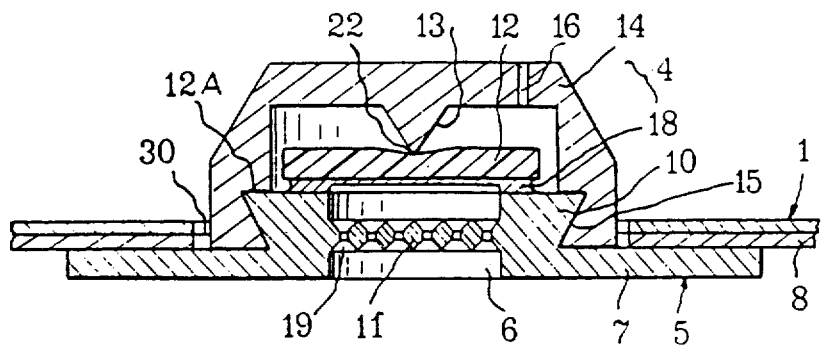

REEXAMINATION CERTIFICATE ISSUED UNDER 35 U.S.C. 307

THE PATENT IS HEREBY AMENDED AS INDICATED BELOW:

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 6, 8 and 13 are determined to be patentable as amended.

Claims 2-5, 7, 9-12 and 14, dependent on an amended claim, are determined to be patentable.

New claims 15 and 16 are added and determined to be patentable.

1. A unidirectional degassing valve for products in thermo-weldable flexible containers, characterized by comprising:
   a. a thermoplastic material molded base member provided with at least one conduit;
   b. a resilient valve member normally closing said conduit and bearing on the base member through a *thin* viscous [layer] *coating*; and
   c. a cap connected with said base member, therewith defining a chamber wherein said resilient valve member is located, and provided with at least one exhaust aperture, through which said chamber communicates with the external atmosphere.

6. A valve as claimed in claim 1, wherein said viscous [layer] *coating* is of silicone oil.

8. A thermo-weldable flexible container provided with at least one degassing valve thermo-welded thereto, said valve comprising:
   a. a base member molded of thermoplastic material and provided with at least one conduit;
   b. a resilient valve member normally closing said conduit and bearing on said base member through a *thin* viscous [layer] *coating*; and
   c. a cap connected with said base member, therewith defining a chamber wherein said resilient valve member is located, and provided with at least one exhaust aperture, through which said chamber communicates with the external atmosphere.

13. A container as claimed in claim 8, wherein said viscous [layer] *coating* is of silicone oil.

*15. A unidirectional degassing valve for use with foodstuffs packaged in thermo-weldable flexible containers, characterized in that the valve comprises:*
   *(a) a base member molded of thermoplastic material and provided with at least one conduit and an engagement surface adjacent said conduit;*
   *(b) a resilient valve member in the form of a substantially flat disc having a generally planar lower engagement surface coextensive with the entire area of said disc, said engagement surface normally closing said conduit by bearing on said engagement surface of said base member through a thin viscous coating confined between the engagement surface of said disc and the engagement surface of said base member, substantially all of said viscous coating being in contact with the engagement surface of said disc; and*
   *(c) a cap connected with said base member, therewith defining a chamber wherein said resilient valve member is located, and provided with at least one exhaust aperture, through which said chamber communicates with the external atmosphere.*

*16. A thermo-weldable flexible container having a foodstuff therein and being provided with at least one degassing valve thermo-welded thereto, said valve comprising:*
   *(a) a base member molded of thermoplastic material and provided with at least one conduit and an engagement surface adjacent thereto;*
   *(b) a resilient valve member in the form of a substantially flat disc having a generally planar engagement surface coextensive with entire area of said disc, said engagement surface normally closing said conduit by bearing on said engagement surface of said base member through a thin viscous coating confined between the engagement surface of said disc and the engagement surface of said base member, substantially all of said viscous coating being in contact with the engagement surface of said disc; and*
   *(c) a cap connected with said base member, therewith defining a chamber wherein said resilient valve member is located and provided with at least one exhaust aperture, through which said chamber communicates with the external atmosphere.*

* * * * *